March 12, 1968   L. W. CORNELL   3,372,852
TAPE
Filed May 26, 1965

INVENTOR.
LEW WALLACE CORNELL
BY
Carpenter, Kinney & Coulter
ATTORNEYS

United States Patent Office 3,372,852
Patented Mar. 12, 1968

3,372,852
TAPE
Lew Wallace Cornell, Mound Minn., assignor to Minnesota Mining and Manufacturing Company, St. Paul, Minn., a corporation of Delaware
Filed May 26, 1965, Ser. No. 458,908
8 Claims. (Cl. 228—50)

This invention relates to composite flexible tapes useful in the fusion welding of various metals. More particularly the invention relates to tapes useful as backing means during formation of butt-weld seams.

In the manufacture of such articles as large tanks designed to hold liquids or bulk solids wherein all welded seams must be 100% welds, i.e., there must be a complete penetration from face to root of the weld material, it is conventional to form the seam in two weld passes. The metal pieces are first fitted together and tack-welded to hold them in place. A sealing bead is then run by handwelding the inside of each seam. All of the seams are then welded on the outside with automatic or semiautomatic welding equipment. This procedure gives good welds, but is expensive and time consuming because of the two passes required. In the case of stainless steel tanks, the welded seams are frequently ground flush with the surrounding metal on the inside, and the two-pass method causes additional delay because of the size of the weld bead which must be ground off.

Various methods have been proposed to eliminate one of the welding steps by the use of a backing means. For example, metal back-up bars, usually of copper, are used when flat sheets are butt-welded together. Only where a great number of pieces of curved metal are to be welded repetitively in a particular shape is is economically feasible to form such a back-up bar having the proper curved shape to fit the curved weld seams. Such back-up bars are often used in combination with inorganic parting layers which prevent joining of the back-up bar to the weld. See for example, Chyle, U.S. Patent 2,792,626, issued May 21, 1957, or Smith, U.S. Patent 2,362,500, issued Nov. 14, 1944.

Other proposed solutions have used heat-resistant tapes, such as glass fabric tape, either alone (as shown in Hackman et al. U.S. Patent 3,001,057 issued Sept. 19, 1961), or in combination with a further backing means such as metal or ceramic material behind the tape (as shown in Clark et al. U.S. Patent 3,001,057 issued June 30, 1964). Such tapes are alone, however, inadequate because of the great tendency of the weld material to burn through the same. Separate backing devices behind the tape are cumbersome and inconvenient to use. British Patent 817,699 shows a tape backed by a metal strip. Such construction require considerable care in welding to avoid burning of the molten weld material through the tape.

The present invention provides composite tapes which can easily be applied as a single unit to the metal parts to be welded. The advantages of the tapes of the present invention are accomplished by the use of a flexible strip of refractory material which is secured to the central portion of the adhesive side of the backing tape. This refractory material is inert and insoluble in the weld material. The refractory strips have very good heat resistance and are able to withstand adverse welding conditions with the electric arc. Although the refractory particles are bonded together with an organic binder to form the refractory strip, the binder is present in small enough quantities that undesirable gas formation and fuming which would interfere with the welding operation does not occur. Moreover, the refractory strips of the present invention are sufficiently gas permeable to permit gases formed in the welding operation to escape therethrough and yet prevent the molten metal weld material from running through. The strips are surprisingly self-supporting, particularly when adhered to a backing, even though the binder is present in a very small amount, and are sufficiently flexible to be wound into roll form for ease of shipment and dispensing. Even after prolonged storage the composite tapes can be easily unwound from the rolls without damaging the refractory strips. The tapes of the present invention can be applied behind the seam to be formed to the metal pieces without the need of any further back-up means and can be removed readily from the metal after the welding operation is completed. The composite tapes conform easily and adhere firmly to a wide variety of curved shapes without special preparation or cumbersome fixtures.

The present invention will be further explained with reference to the accompanying drawings in which.

Figure 1:
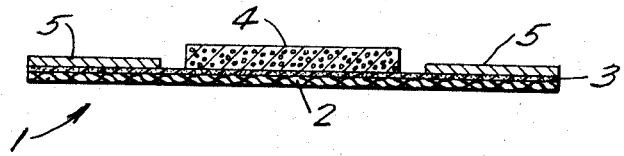
FIGURE 1 is a cross-sectional view of a tape of the present invention.

Referring more specifically to the drawings, in FIGURE 1 there is seen composite tape 1 in the form in which it would ordinarily be shipped, stored and sold prior to application to the metal to be welded. The composite tape 1 is formed from a backing 2 coated on one side with an adhesive 3. A self-supporting flexible strip of refractory material 4 is affixed to the central portion of the backing. The exposed surfaces of the adhesive are preferably protected by suitable liners 5.

Figure 2:
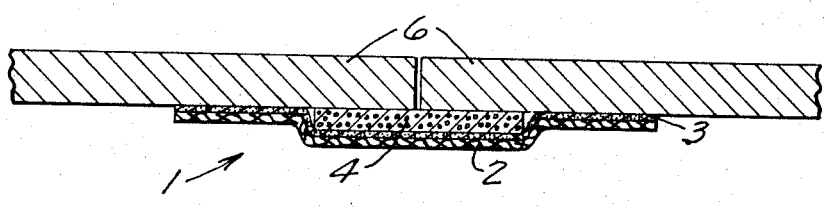
FIGURE 2 is a fragmental cross-sectional view of a seam and backing material in position before welding.

In FIGURE 2 are seen two pieces of metal 6 in position to be joined by welding. The tape is attached by first removing the liners 5, positioning the refractory strip 4 centrally over the seam to be formed and adhering the adhesive outer edges of the tape to the metal on opposite sides of the seam line.

The preferred material for the backing is glass fabric. Other materials can be substituted, however, such as metal foil, paper treated with a flame retardant composition, or fabric formed from fibers such as cotton, nylon or rayon, treated with flame retardant compositions if desired.

The adhesive employed is preferably a heat-resistant pressure-sensitive adhesive such as a silicone pressure-sensitive adhesive. These adhesives are generally based on dimethylsilane polymer gums tackified with a silicone resin. Other adhesives such as crude rubber adhesives, acrylic homopolymer or copolymer adhesives or the like can be substituted if the conditions to be encountered during the welding operation are not excessively severe. If desired, the adhesive can be of a nontacky heat activatable type such as polyethylene or other thermoplastic material in which event the tape must be heated during application. For ease in application it is therefore preferred to use pressure-sensitive adhesives.

In the case of thermoplastic adhesives or other adhesives which are not tacky under ambient conditions, the liners 5 would obviously be eliminated. In the case of pressure-sensitive adhesives, however, protective liners are desirable. Such liners can be formed from any suitable materials conventionally used in the art, for example, treated crepe paper, polyethylene, polypropylene, coated parchment, vinyl film, or the like.

The particulate refractory material used in making the strip 4 is preferably a non-metallic inorganic material. Materials which have been found suitable include silicon carbide, aluminum oxide, silicon dioxide, glass beads, glass cullet, fired clay bubbles, and the like. Particles of high temperature melting metals are operative, but presently economically unfeasible. Particles of welding flux have also been found suitable. The particles can be in a size range of from 50 or possibly 100 up to about 4,000 microns. Particle sizes below 50–100 microns form refractory strips of such density that gases generated in welding cannot escape therethrough; consequently, the strips do not permit the formation of smooth, continuous welds. Particles above 4,000 microns result in coarse strips which are difficult to handle, which may separate into wide cracks if bent around a sharp corner, and which are difficult to form into the relatively thin strips desired in the composite tapes of the present invention. Optimum results have been obtained using particles ranging in size between 200 and 2,000 microns. The particulate materials are bound together with a small amount of elastomeric or flexible, stretchable, resinous material. Normally the binder material should be present in an amount less than about 10% by weight of the refractory material in order to prevent undue gas formation due to burn off of the elastomer during welding. 2% by weight of the refractory is the preferred amount of binder in the case of dense refractory particles because this amount will provide a self-supporting strip and at the same time minimize objectionable gasing during welding resulting from burn off of the binder. It will be understood that in the case of hollow particles such as glass beads the same proportionate volume of elastomer should be present even though the weight percentage might be above 10%. On a volume basis the binder should occupy between 0.5 and 10 percent of the bulk volume of the strip. The preferred thickness of the refractory strip is about 3 mm. Generally the thickness will not be greater than about 6.5 mm.

The preferred method of making the refractory strip involves thoroughly mixing the particulate refractory material with a solution of elastomer in a volatile solvent or as a latex. This mixture is then formed into the desired shape and dried. Various methods can be used to form the strips into the desired shape. For example, the refractory material can be continuously extruded into strips of the desired width and thickness. Alternatively the mixture can be cast into a channel having the desired width or formed into a wide flat sheet, for example, by passing the same between rollers and then cutting the wide sheet into narrow strips of the desired width. Casting and pressing are the preferred methods for producing strips from highly abrasive particles because the wear caused by the latter on extrusion equipment makes extrusion uneconomical. If the refractory strips are formed by extrusion the extruded rod can be passed directly through a drying chamber. If on the other hand the strips are formed by casting a more flowable mixture it is preferred to support the material during drying on a smooth liner from which it can be removed easily after drying. Temperatures between 50° and 125° C. have been found suitable for driving off the volatile solvent or water. In a further embodiment the material can be cast on a sheet of aluminum foil or other backing and allowed to become bonded thereto during drying in which event the sheet becomes a part of the final backup tape construction.

In addition to water used as a carrier liquid in the case of a latex, various organic solvents such as heptane, toluol, xylol, mineral spirits, benzol, carbon tetrachloride, trichloroethylene, and the like, can be used.

Figure 3:
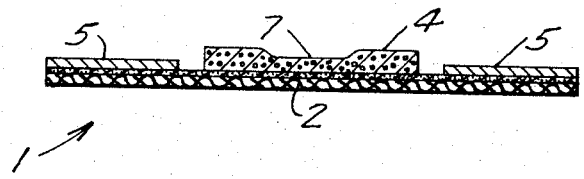
FIGURE 3 is a cross-sectional view of a tape formed in accordance with a further embodiment of the present invention.

In the embodiment shown in FIGURE 3 a groove 7 is formed in the surface of the refractory strip. Such grooves are useful in the case of some welding operations where it is desired to cause the weld material to run down a greater distance on the inside of the seam, thereby producing a seam having greater thickness. Such a groove can easily be formed in the refractory strip by casting the same in a channel having a ridge in the center thereof or passing a preformed strip through a roller having an appropriate circumferential ridge.

The strip of the desired width, generally between about 0.5 and 5 cm. is applied to the center of the tape which is to form the backing material and wound onto rolls of a suitable size and shape. If the strip is narrow, less than about 1.5 cm. in width, more care must be exercised in positioning the tape than in the case of wider strips. The backing material can be between about 2.5 and 10 cm in width and is preferably 5 to 8 cm. wide.

Gases generated during the welding operations can escape through refractory strips of the present invention. In the case of somewhat porous backings, such as glass cloth tape, these gases can escape both through the thickness and along the length of the strip. It is believed that most of these gases escape lengthwise of the strip, in view of the fact that the performance of the tapes of the present invention is not significantly impaired by the use of non-porous backings such as aluminum foil.

The invention will be further described with reference to the following examples.

Example I 100 grams glass cullet having a size range of about 150 to 1,000 microns (sold as 042 glass cullet by the Bassichis Company) were mixed with 3.3 grams of the latex mixture formulated by mixing 200 grams crude natural rubber latex containing 60% solids, 4.8 grams of a dispersion of zinc dibutyldithiocarbamate in water (50% solids concentration), 1.2 grams of 2,2'-methylene bis(4-methyl-6-tert. butylphenol) as an anti-oxidant, and 1.2 grams alkyl aryl sodium sulphonate detergent. The mixture was formed into a 3.2 mm. thick, 2.5 cm. wide strip by casting the same into a continuously moving channel, drying and passing the channel under a roller to compress the refractory layer to the desired thickness. A portion of this refractory strip was applied to a glass cloth tape coated with silicone pressure-sensitive adhesive (a polymer of dimethylsiloxane having a small percentage of phenyl groups substituted for methyl groups tackified with silicone resin). The exposed silicone adhesive was covered with liners formed from alkyd saturated crepe paper.

This construction was particularly suitable for the welding of stainless steel. Welds were produced by one pass of an arc welder on seams backed up by the tape. X-rays of the welds showed them to be free from porosity and inclusions, and physical tests showed the welds to be sound.

A second portion of the flexible refractory strip was applied to glass cloth coated with a thermosetting crude rubber adhesive of the following composition:

| | Gms. |
|---|---|
| Smoked Sheets crude rubber | 100 |
| Zinc oxide | 20 |
| Titanium dioxide | 20 |
| Polyterpene resin of high melting point (Piccolyte S-115, Pennsylvania Industrial Chemical Corporation) | 60 |
| Heat treated wood rosin (Tenex, Newport Industries) | 20 |
| Heat-reactive, oil-soluble, 100% phenolic resin (CKR–1634, Bakelite Corporation) | 20 |
| Zinc resinate (Zirex, Newport Industries) | 5 |

This construction worked well as a backup tape in the welding of both stainless steel and mild steel. The mild steel was 12 gauge and was welded by the inert gas shielded-arc process.

A third portion of the flexible refractory strip was adhered to a tape comprising untreaed cotton cloth coated with a pressure-sensitive adhesive consisting of pigmented crude rubber tackified with a polyterpene resin. The tape was useful in forming satisfactory welds, and fell off of the metal immediately after welding. The cloth, however, tended to create a fire hazard in the absence of flame-retardant treatment.

Example II

A refractory strip was made by mixing and molding into a strip 200 grams of grit #10 Alundum abrasive (3M Company) having a particle size ranging from about 1,500 to 4,000 microns, and 1.67 grams of the latex mixture of Example I. The strip had the same dimensions as that of Example I and was applied to a strip of glass cloth tape with silicone adhesive as in Example II. An excellent weld was formed by using the composite tape as a backing in submerged-arc welding of steel.

*Example III*

100 grams of welding flux (Lincoln No. 760 welding flux) shown by spectographic analysis to contain mainly silicon and manganese oxides with some free silicon and/or manganese metal and containing lesser amounts of aluminum, iron, and calcium oxides, and a minor amount of sodium silicate binder, was mixed with 20 grams of a solution containing a saturated polyisobutylene of approximately 120,000 molecular weight as a 10% solids solution in heptane. After thorough mixing the mixture was cast into a flat sheet about 3.2 mm. thick and cut into strips approximately 2.5 cm. wide. The strips were adhered to the central portion of a 7.5 cm. wide glass cloth tape coated on one side with a pressure-sensitive silicone adhesive.

*Example IV*

50 grams of welding flux of the general type used in Example III, but also containing small amounts of magnesium, chromium, and nickel oxides, and having a particle size of about 125 to 1,600 microns, (Lincoln ST–100 welding flux) was mixed with 50 grams of the same flux, which had been ball-milled for two hours to an average particle size of 50 to 100 microns. This mixture was further mixed with 18.2 grams of a solution in heptane containing 11% solids of saturated polyisobutylene of approximately 120,000 molecular weight. A 3.2 mm. thick layer of the mixture was cast onto 0.076 mm. thick hard aluminum foil. The composite refractory-foil sheet was cut into 2.5 cm. wide strips. The foil backed strips were attached to the central portion of a 7.6 cm. wide silicone pressure-sensitive adhesive coated glass cloth tape.

*Example V*

100 grams of the underground welding flux used in Example IV were mixed with 16.7 grams of a solution of polymethylsiloxane polymer in toluol containing 24% solids, and 1.33 grams of a solution of benzoyl peroxide in toluol at 6% solids. The mixture was cast into a sheet 3.2 mm. thick and cut into 2.5 cm. wide strips which were applied to the central portion of glass cloth tape as in Example IV.

*Example VI*

100 grams of aluminum oxide particles having an average diameter of about 600 microns were mixed with 11.1 grams of a solution of a saturated polyisobutylene of approximately 120,000 molecular weight in heptane containing 9% solids. The mixture was cast onto 0.05 mm. thick soft aluminum foil. The foil and the bonded aluminum oxide particles were cut into 2.5 cm. wide strips and applied to a glass cloth backing coated on one side with a pressure-sensitive silicone adhesive.

*Example VII*

100 grams of aluminum oxide having an average particle size of about 600 microns and 25 grams of the unground welding flux used in Example IV were mixed with 2 grams of a natural rubber latex containing 60% solids and 2 grams of a water dispersion of a copolymer of isobutylene with a small amount of isoprene, said dispersion also containing 60% solids. The mixture was continuously cast into a channel, dried, and compacted by passing the channel under a roller. The strips which were about 3.2 mm. thick and 2.5 cm. wide were applied to the central portion of a glass cloth tape as in Example IV.

*Example VIII*

100 grams of aluminum oxide particles having an average particle size of about 700 to 1,500 microns were mixed with 3.3 grams of a latex mixture formulated by mixing 100 grams of natural rubber latex containing 60% solids and 100 grams of a water dispersion of a copolymer of isobutylene with a small amount of isoprene containing 60% solids with 2.4 grams of a "hindered" phenol antioxidant and 2.4 grams of an alkyl aryl sodium sulfonate detergent. The mixture of refractory and latex was cast, dried, pressed, and applied to a tape as in Example VII.

*Example IX*

A refractory strip formed by mixing 100 grams fired clay bubbles having a particle size of about 100 to 800 microns (Kanamite grade 200 made by Ferro Corp.) and 3.3 grams of the latex mixture of Example VIII was cast, pressed and applied to a tape as in Example VII. The composite tape was an excellent backing for welding stainless steel.

*Example X*

A flexible refractory strip was formed as in Example VIII from 100 grams of grit #24 Alundum abrasive (3M Company) having particle size ranging between about 700 to 1,500 microns and 3.3 grams of the latex mixture of Example VIII. A shallow groove about 0.6 cm. wide was formed in the strip. Portions of this strip were adhered to the following backings:
(1) Cotton cloth tape as Example I above.
(2) .076 mm. thick soft aluminum foil coated with a pressure-sensitive adhesive which is a copolymer of 95.5% by weight isooctyl acrylate and 4.5% acrylic acid.
(3) .051 mm. thick soft aluminum foil coated with a pigmented silicone adhesive consisting of polydimethylsiloxane tackified with a silicone resin (Dow Corning C–274 adhesive), pigmented with 30% by weight of titanium dioxide on the total weight of silicone, and cured with 2% by weight of benzoyl peroxide on the weight of silicone.
(4) .025 mm. thick polyimide film (Du Pont "Kapton" film) coated with a silicone pressure-sensitive adhesive of the type described in Example I.

All of these constructions performed satisfactorily in submerged-arc welding.

What is claimed is:
1. A unitary tape material useful as a backing means in metal welding comprising a flexible backing coated with adhesive, a strip of flexible refractory material adhered to a central portion of the coated side of said backing, said refractory material comprising inorganic particles within the size range of 50 to 4,000 microns bound together with a minor amount, less than 10 percent, of the bulk volume of said refractory material of a flexible organic binder, said unitary tape material being continuously flexible throughout the length thereof whereby the unitary tape material is capable of being wound into roll form for shipment and storage and subsequently unwound and adhesively applied to metal substrates of varying contours.

2. The material of claim 1 wound in roll form.

3. The material of claim 1 wherein said particles are between 200 and 2,000 microns.

4. A welding backup tape comprising a flexible flame-resistant backing coated on one side with a heat-resistant adhesive, a flexible refractory strip attached to the central portion of the adhesive-coated side of said backing, said refractory strip being sufficiently thick to support molten metal during welding, and being formed of refractory particles bonded together to form an integral self-supporting strip by means of a minor proportion of a flexible elastomeric binder.

5. The material of claim 1 wherein said backing material comprises a glass fabric tape and wherein said adhesive is a silicone pressure-sensitive adhesive.

6. A welding backup tape comprising a flexible flame-resistant backing, coated on one side with a silicone pressure-sensitive adhesive, said backing material having a width of between about 2.5 and 10 cm., a flexible refractory strip attached to the central portion of the adhesive coated side of said backing, said refractory strip being between about 2 and about 6.5 mm. thick and between about 0.5 to about 5 cm. wide, said refractory strip comprising refractory inorganic particles ranging in diameter between 200 and 2,000 microns, said refractory particles being bonded together to form an integral self-supporting strip by means of a flexible and stretchable organic binder, said binder comprising between about 0.5 and about 10 percent of the bulk volume of said refractory strip, the adhesive on opposite sides of said refractory strip being protected by a removable liner.

7. A welding backup tape according to claim 4 wherein said flexible backing comprises aluminum foil.

8. A welding backup tape according to claim 7 wherein said adhesive comprises an acrylate-based pressure sensitive adhesive.

References Cited

UNITED STATES PATENTS

| | | | |
|---|---|---|---|
| 1,698,360 | 1/1929 | Day | 27—500 |
| 2,820,427 | 1/1958 | Chyle et al. | 228—50 |
| 2,847,958 | 8/1958 | Norton | 219—160 |
| 3,040,686 | 6/1962 | Buskirk | 228—56 |

RICHARD H. EANES, JR., *Primary Examiner.*

JOHN F. CAMPBELL, M. L. FAIGUS, *Examiners.*

UNITED STATES PATENT OFFICE
CERTIFICATE OF CORRECTION

Patent No. 3,372,852                      March 12, 1968

Lew Wallace Cornell

It is certified that error appears in the above identified patent and that said Letters Patent are hereby corrected as shown below:

Column 1, line 21, "semiautomatic" should read -- semi-automatic --; line 34, "is", second occurrence, should read -- it --; line 40, 2,362,500" should read -- 2,362,505 --; line 47, "3,001,057" should read -- 3,138,863 --; line 52, "construction" should read -- constructions --. Column 2, line 52, "nontacky" should read -- non-tacky --. Column 4, line 66, "untreaed" should read -- untreated --. Column 5, line 6, "Example II" should read -- Example I --. Column 6, line 32, after "as" insert -- in --.

Signed and sealed this 28th day of October 1969.

(SEAL)
Attest:

Edward M. Fletcher, Jr.                  WILLIAM E. SCHUYLER, JR.
Attesting Officer                        Commissioner of Patents